Feb. 11, 1941.　　D. P. SHOCKNEY　　2,231,300
IRRIGATING FLOWERPOT
Filed May 1, 1939
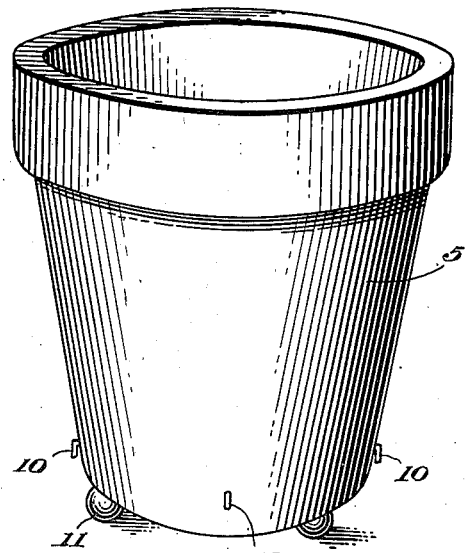
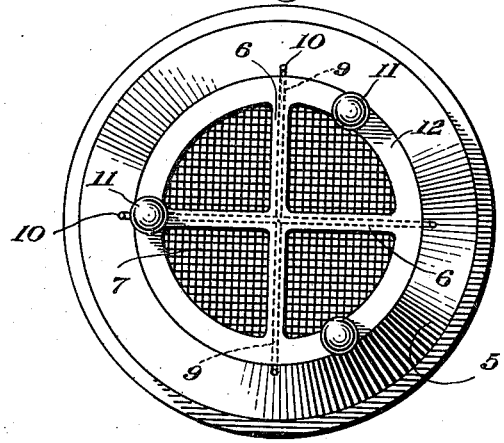
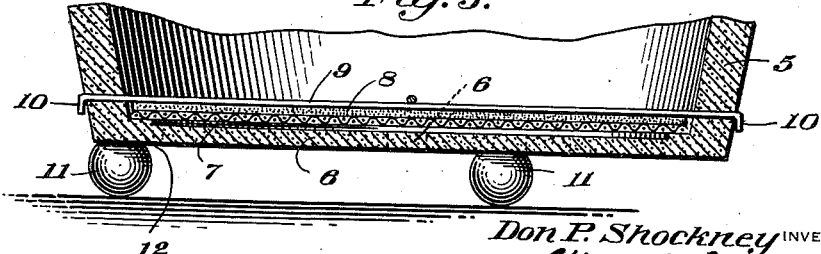
Don P. Shockney INVENTOR
BY Victor J. Evans & Co.
ATTORNEYS Patented Feb. 11, 1941

2,231,300

UNITED STATES PATENT OFFICE 2,231,300

IRRIGATING FLOWERPOT

Don P. Shockney, Daytona Beach, Fla.

Application May 1, 1939, Serial No. 271,152

2 Claims. (Cl. 47—34)

The present invention relates to a new and improved irrigating flowerpot.

An important object of the invention resides in the provision of a flowerpot, the walls of which are formed of a porous material which by capillary attraction, imparts sufficient moisture to the soil or aggregate within the pot to generate the growth of flowers and the like therein.

A further object of the invention is to provide a flowerpot formed of a mixture of clay, saw dust and peat to form a porous wall structure, the bottom wall of the pot being closed by layers of relatively open mesh material to prevent filtering of the soil within the pot as well as provide for the circulation of water and air.

The invention will be fully and comprehensively understood from a consideration of the following detailed description when read in connection with the accompanying drawing which forms a part of the application.

In the drawing:

Figure 1 is a perspective view of a flowerpot embodying the features of the present invention.

Figure 2 is a bottom plan view thereof, and

Figure 3 is a fragmentary vertical sectional view illustrating in detail the structure of the bottom wall of the pot.

The flowerpot generally designated by the reference numeral 5 is formed of a mixture of clay, saw dust and peat, the combination of which provides a readily porous structure. The preferred proportions are a mixture of 75% in volume of clay and 25% in volume of saw dust and peat. Varying this mixture from 10% saw dust and peat up to 50% governs the porosity of the ware after firing. During the fabrication of the article the mixture is fired in a conventional manner but is not glazed.

As is to be understood, the pot 5 can be formed of any desired shape or size, the same being open at the top and bottom ends. The bottom end is formed with crossed straps 6 of clay burned or fused into the side walls of the ware which forms a supporting means for an open mesh wire material 7, said material resting upon the crossed straps in the manner more clearly shown in Figure 3 of the drawing. A thickness of coarse burlap or similar material 8 is positioned over the wire material 7, the burlap and screen material being held in place by means of the crossed wires 9 which extend through the side walls of the pots with the extending ends thereof bent at right angles as indicated at 10 for retaining the same in position. The mesh material 7 and burlap 8 provide sufficient rigidity to the bottom of the pot for retaining the soil or other aggregate.

The pot 5 is supported by means of the balls of clay or similar material 11 secured in spaced relation on the bottom rim 12 which retain the bottom of the pot above the bottom of a receptacle containing water within which said pot is placed. As is to be understood, the level of the water within the receptacle is to be above the crossed wires 9 so that the walls of the pot by capillary attraction, may absorb the water and convey it into the soil or other aggregate contained within the pot.

The pot 5 when constructed of a relatively large size is especially adapted for permanent setting in the ground, and for such use the wire mesh bottom can be made of mesh so light that it will disintegrate in the soil in a comparatively short time permitting the plant roots to project through the bottom of the pot for growth in the ground. In other words, the entire pot containing the flower or shrub is planted within the ground and after a period of time the wire mesh and burlap will disintegrate thereby permitting the roots of the plant to grow directly into the ground. This is a particular advantage in the growing of certain plants and shrubbery which must be established in some particular type of soil different from the ordinary soil of lawns and gardens, the proper type of soil being contained within the pot to be transplanted.

For containing the type of flowers or shrubs to be kept indoors the pot is especially desirable in that frequent watering of the plant is unnecessary. The pot 5 will rest within a dish-shaped receptacle containing a quantity of water, the water from the receptacle being fed to the plant and soil by the capillary attraction of the side walls of the pot thus providing an even distribution of moisture through the pot and its contents.

If soluble fertilizer salts are added to the water in the receptacle, these are also carried up through the wall and soil thus supplying a growing plant with a controlled balance of moisture and materials with sufficient aeration thereby rapidly generating growth of the plant while maintaining the same in a healthy condition.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. A flowerpot of the character described including a receptacle having porous side walls, said receptacle having open top and bottom ends, crossed straps attached to the bottom face of said walls, an open mesh wire material held within said receptacle adjacent the bottom end thereof by said straps, and wires extending through the side walls of said receptacle and substantially parallel to said crossed straps for holding said material in position, whereby to provide a bottom for said receptacle for retaining soil therein.

2. A flowerpot of the character described comprising a receptacle having open top and bottom ends, supporting straps extending transversely of the bottom end of said receptacle, a layer of material of a predetermined porosity held within said receptacle adjacent the bottom end by said straps, a layer of material of less porosity than said first layer adjacent said first layer, whereby to provide a bottom for said receptacle for retaining soil therein, and wires extending through the walls of said receptacle adjacent the bottom end thereof and substantially parallel to said crossed straps for holding said layers of material in position.

DON P. SHOCKNEY.